US012073774B2

(12) United States Patent
Lee et al.

(10) Patent No.: US 12,073,774 B2
(45) Date of Patent: Aug. 27, 2024

(54) PIXEL, DISPLAY APPARATUS INCLUDING THE SAME AND METHOD OF DRIVING THE DISPLAY APPARATUS

(71) Applicant: Samsung Display Co., Ltd., Yongin-si (KR)

(72) Inventors: Eunjung Lee, Yongin-si (KR); Woo-Young Cheon, Suwon-si (KR); Hyungsuk Hwang, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/670,905

(22) Filed: Feb. 14, 2022

(65) Prior Publication Data

US 2022/0335884 A1 Oct. 20, 2022

(30) Foreign Application Priority Data

Apr. 16, 2021 (KR) ........................ 10-2021-0049958

(51) Int. Cl.
*G09G 3/3233* (2016.01)
*G09G 3/32* (2016.01)

(52) U.S. Cl.
CPC ....... *G09G 3/32* (2013.01); *G09G 2300/0842* (2013.01); *G09G 2310/0243* (2013.01); *G09G 2310/08* (2013.01); *G09G 2320/0247* (2013.01)

(58) Field of Classification Search
CPC ....... G09G 2310/0243; G09G 2310/08; G09G 2320/0247; G09G 3/3208; G09G 3/3233
See application file for complete search history.

(56) References Cited

U.S. PATENT DOCUMENTS 11,107,411 B1 * 8/2021 Zhang .................. G09G 3/3258
2021/0327352 A1 * 10/2021 Zhang .................. G09G 3/3233

FOREIGN PATENT DOCUMENTS

KR 101152466 B1 6/2012
KR 102281222 B1 7/2021

* cited by examiner

*Primary Examiner* — Dennis P Joseph
(74) *Attorney, Agent, or Firm* — CANTOR COLBURN LLP

(57) ABSTRACT

A pixel includes a light-emitting element, a driving switching element and a noise switching element. The driving switching element applies a driving current to the light-emitting element. The noise switching element outputs a noise signal having a noise frequency to an input electrode of the driving switching element in response to a noise control signal. The noise frequency is equal to or greater than a driving frequency of the pixel. The noise signal having a periodicity is applied to the input electrode of the driving switching element of the pixel.

15 Claims, 14 Drawing Sheets

| ES(%) | 80 | 90 | 96 | 98 | 99 |
|---|---|---|---|---|---|
| SNR(dB) | <80 | 83.3 | 87.8 | 85.3 | noise zero |

PIXEL, DISPLAY APPARATUS INCLUDING THE SAME AND METHOD OF DRIVING THE DISPLAY APPARATUS

This application claims priority to Korean Patent Application No. 10-2021-0049958, filed on Apr. 16, 2021, and all the benefits accruing therefrom under 35 U.S.C. § 119, the content of which in its entirety is herein incorporated by reference.

BACKGROUND

1. Field

Embodiments of the invention relate to a pixel, a display apparatus including the pixel and a method of driving the display apparatus. More particularly, embodiments of the invention relate to a pixel reducing a flicker to enhance a display quality, a display apparatus including the pixel and a method of driving the display apparatus.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines, the data driver outputs data voltages to the data lines, and the emission driver outputs emission signals to the emission lines. The driving controller controls the gate driver, the data driver and the emission driver.

SUMMARY

When an image displayed on a display panel is a static image or the display panel is operated in always-on mode, a driving frequency of the display panel may be decreased to reduce a power consumption.

When the driving frequency of the display panel is decreased, a flicker may be generated due to a current leakage so that a display quality of the display panel may be deteriorated.

Embodiments of the invention provide a pixel capable of reducing a power consumption and enhancing a display quality.

Embodiments of the invention provide a display apparatus including the pixel.

Embodiments of the invention provide a method of driving the display apparatus.

In an embodiment of a pixel according to the invention, the pixel includes a light-emitting element, a driving switching element and a noise switching element. The driving switching element applies a driving current to the light-emitting element. The noise switching element outputs a noise signal having a noise frequency to an input electrode of the driving switching element in response to a noise control signal.

In an embodiment, the noise frequency may be equal to or greater than a driving frequency of the pixel.

In an embodiment, the pixel may include a first pixel switching element including a control electrode connected to a first node, an input electrode connected to a second node and an output electrode connected to a third node, a second pixel switching element including a control electrode which receives a data write gate signal, an input electrode which receives a data voltage and an output electrode connected to the second node, a third pixel switching element including a control electrode which receives a compensation gate signal, an input electrode connected to the first node and an output electrode connected to the third node, a fourth pixel switching element including a control electrode which receives a data initialization gate signal, an input electrode which receives an initialization voltage and an output electrode connected to the first node, a fifth pixel switching element including a control electrode which receives an emission signal, an input electrode which receives a first power voltage and an output electrode connected to the second node, a sixth pixel switching element including a control electrode which receives the emission signal, an input electrode connected to the third node and an output electrode connected to an anode electrode of the light-emitting element, a seventh pixel switching element including a control electrode which receives a light-emitting element initialization gate signal, an input electrode which receives the initialization voltage and an output electrode connected to the anode electrode of the light-emitting element, an eighth pixel switching element including a control electrode which receives the noise control signal, an input electrode which receives a noise voltage and an output electrode connected to the second node and the light-emitting element including the anode electrode and a cathode electrode which receives a second power voltage. The driving switching element may be the first pixel switching element. The noise switching element may be the eighth pixel switching element.

In an embodiment, the pixel may include a first pixel switching element including a control electrode connected to a first node, an input electrode connected to a second node and an output electrode connected to a third node, a second pixel switching element including a control electrode which receives a data write gate signal, an input electrode which receives a data voltage and an output electrode connected to the second node, a third pixel switching element including a control electrode which receives a compensation gate signal, an input electrode connected to the first node and an output electrode connected to the third node, a fourth pixel switching element including a control electrode which receives a data initialization gate signal, an input electrode which receives a first initialization voltage and an output electrode connected to the first node, a fifth pixel switching element including a control electrode which receives an emission signal, an input electrode which receives a first power voltage and an output electrode connected to the second node, a sixth pixel switching element including a control electrode which receives the emission signal, an input electrode connected to the third node and an output electrode connected to an anode electrode of the light-emitting element, a seventh pixel switching element including a control electrode which receives a light-emitting element initialization gate signal, an input electrode which receives a second initialization voltage and an output electrode connected to the anode electrode of the light-emitting element, an eighth pixel switching element including a control electrode which receives the noise control signal, an input electrode which receives a noise voltage and an output electrode connected to the second node and the light-emitting element including the anode electrode and a cathode electrode which receives a second power voltage. The driving switching element may be the first pixel switching element. The noise switching element may be the eighth pixel switching element.

In an embodiment of a display apparatus according to the invention, the display apparatus includes a display panel, a gate driver, a data driver, an emission driver and a noise generator. The display panel includes a pixel. The gate driver applies a gate signal to the pixel. The data driver applies a data voltage to the pixel. The emission driver applies an emission signal to the pixel. The noise generator generates a noise signal having a noise frequency based on a driving frequency of the display panel. The pixel includes a light-emitting element and a driving switching element which applies a driving current to the light-emitting element. The noise signal is applied to an input electrode of the driving switching element.

In an embodiment, the noise generator may include a noise frequency determiner which determines the noise frequency based on the driving frequency.

In an embodiment, as the driving frequency decreases, the noise frequency may decrease.

In an embodiment, the noise frequency may be equal to or greater than the driving frequency.

In an embodiment, the noise generator may include a noise voltage determiner which determines a noise voltage based on the driving frequency and an end-to-start luminance ratio of the display panel.

In an embodiment, as the driving frequency decreases, the noise voltage may increase.

In an embodiment, as the end-to-start luminance ratio of the display panel decreases, the noise voltage may increase.

In an embodiment, the noise generator may include a noise voltage determiner which determines a noise voltage based on the driving frequency, an end-to-start luminance ratio of the display panel and grayscale data of input image data.

In an embodiment, the pixel may further include a noise switching element which outputs the noise signal to the input electrode of the driving switching element in response to a noise control signal.

In an embodiment, the pixel may include a first pixel switching element including a control electrode connected to a first node, an input electrode connected to a second node and an output electrode connected to a third node, a second pixel switching element including a control electrode which receives a data write gate signal, an input electrode which receives a data voltage and an output electrode connected to the second node, a third pixel switching element including a control electrode which receives a compensation gate signal, an input electrode connected to the first node and an output electrode connected to the third node, a fourth pixel switching element including a control electrode which receives a data initialization gate signal, an input electrode which receives an initialization voltage and an output electrode connected to the first node, a fifth pixel switching element including a control electrode which receives an emission signal, an input electrode which receives a first power voltage and an output electrode connected to the second node, a sixth pixel switching element including a control electrode which receives the emission signal, an input electrode connected to the third node and an output electrode connected to an anode electrode of the light-emitting element, a seventh pixel switching element including a control electrode which receives a light-emitting element initialization gate signal, an input electrode which receives the initialization voltage and an output electrode connected to the anode electrode of the light-emitting element, an eighth pixel switching element including a control electrode which receives the noise control signal, an input electrode which receives a noise voltage and an output electrode connected to the second node and the light-emitting element including the anode electrode and a cathode electrode which receives a second power voltage. The driving switching element may be the first pixel switching element. The noise switching element may be the eighth pixel switching element.

In an embodiment, the pixel may include a first pixel switching element including a control electrode connected to a first node, an input electrode connected to a second node and an output electrode connected to a third node, a second pixel switching element including a control electrode which receives a data write gate signal, an input electrode which receives a data voltage and an output electrode connected to the second node, a third pixel switching element including a control electrode which receives a compensation gate signal, an input electrode connected to the first node and an output electrode connected to the third node, a fourth pixel switching element including a control electrode which receives a data initialization gate signal, an input electrode which receives a first initialization voltage and an output electrode connected to the first node, a fifth pixel switching element including a control electrode which receives an emission signal, an input electrode which receives a first power voltage and an output electrode connected to the second node, a sixth pixel switching element including a control electrode which receives the emission signal, an input electrode connected to the third node and an output electrode connected to an anode electrode of the light-emitting element, a seventh pixel switching element including a control electrode which receives a light-emitting element initialization gate signal, an input electrode which receives a second initialization voltage and an output electrode connected to the anode electrode of the light-emitting element, an eighth pixel switching element including a control electrode which receives the noise control signal, an input electrode which receives a noise voltage and an output electrode connected to the second node and the light-emitting element including the anode electrode and a cathode electrode which receives a second power voltage. The driving switching element may be the first pixel switching element. The noise switching element may be the eighth pixel switching element.

In an embodiment, the pixel may further include a data writing switching element which outputs a noise data voltage which is a sum of the data voltage and the noise signal to the input electrode of the driving switching element in response to the data write gate signal.

In an embodiment, the noise generator may determine the noise frequency and to output the noise frequency to the gate driver. The noise generator may determine a noise voltage and to output the noise voltage to the display panel.

In an embodiment, the noise generator may determine the noise frequency and a noise voltage and to output the noise frequency and the noise voltage to the data driver.

In an embodiment of a method of driving a display apparatus according to the invention, the method includes applying a gate signal to a pixel including a light-emitting element and a driving switching element which applies a driving current to the light-emitting element, applying a data voltage to the pixel, generating a noise signal having a noise frequency based on a driving frequency of a display panel, applying the noise signal to an input electrode of the driving switching element and applying an emission signal to the pixel.

In an embodiment, the noise frequency may be equal to or greater than the driving frequency.

According to the pixel, the display apparatus including the pixel and the method of driving the display apparatus, when an image displayed on the display panel is a static image or the display panel is operated in always-on mode, the driving frequency of the display panel may be decreased to reduce a power consumption of the display apparatus.

The noise signal having a periodicity may be applied to the input electrode of the driving switching element of the pixel so that the flicker due to the current leakage may be reduced when the display panel is driven at the low driving frequency. The flicker may be reduced so that the display quality of the display panel may be enhanced.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
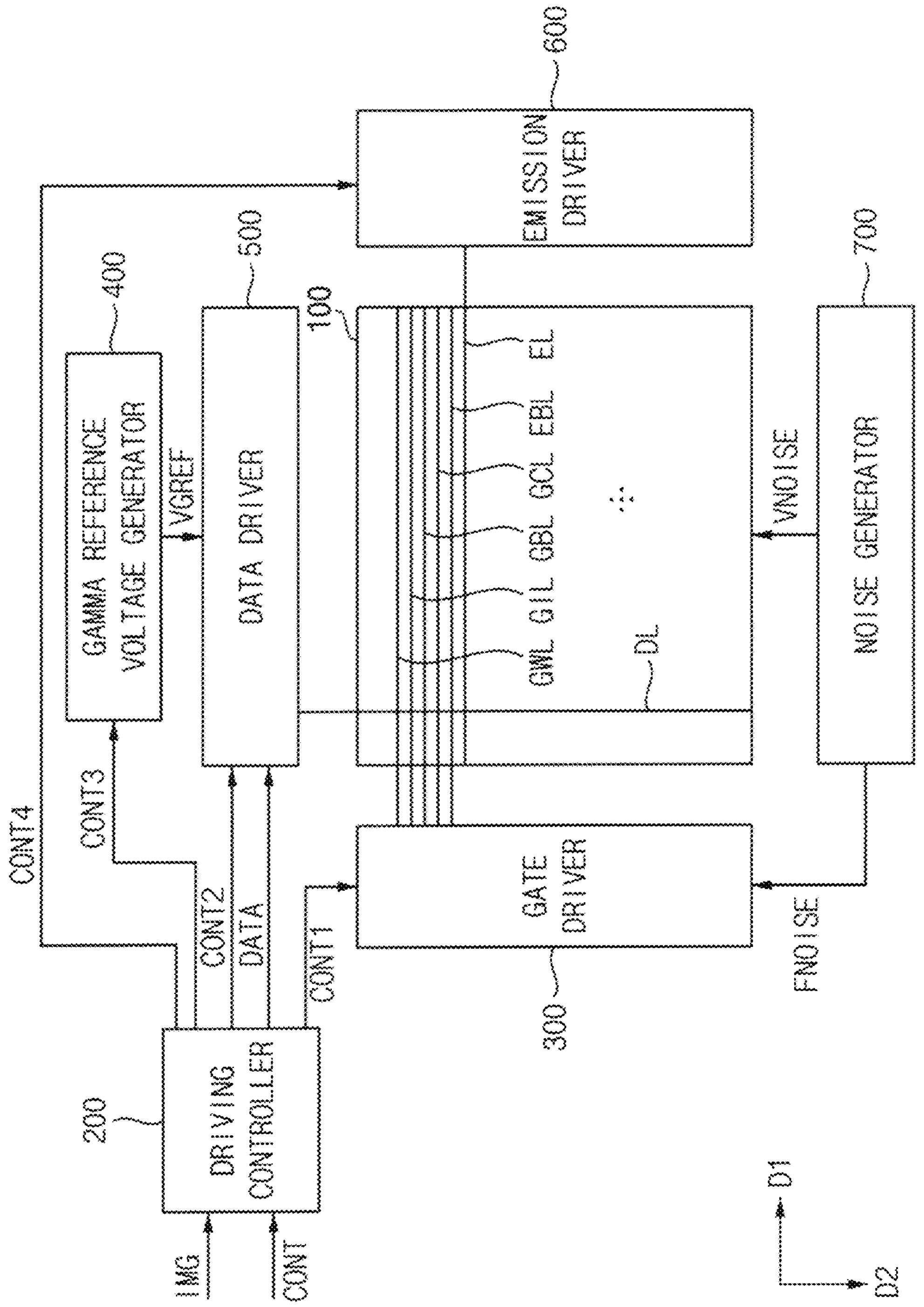
FIG. 1 is a block diagram illustrating an embodiment of a display apparatus according to the invention.

Hereinafter, the invention will be explained in detail with reference to the accompanying drawings.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

FIG. 1 is a block diagram illustrating an embodiment of a display apparatus according to the invention.

Referring to FIG. 1, the display apparatus includes a display panel 100 and a display panel driver. The display panel driver includes a driving controller 200, a gate driver 300, a gamma reference voltage generator 400, a data driver 500, an emission driver 600 and a noise generator 700.

The display panel 100 has a display region on which an image is displayed and a peripheral region adjacent to the display region.

The display panel 100 includes a plurality of gate lines GWL, GIL, GBL, GCL and EBL, a plurality of data lines DL, a plurality of emission lines EL and a plurality of pixels electrically connected to the gate lines GWL, GIL, GBL, GCL and EBL, the data lines DL and the emission lines EL. The gate lines GWL, GIL, GBL, GCL and EBL may extend in a first direction D1, the data lines DL may extend in a second direction D2 crossing the first direction D1 and the emission lines EL may extend in the first direction D1.

The driving controller 200 receives input image data IMG and an input control signal CONT from an external apparatus. In an embodiment, the input image data IMG may include red image data, green image data and blue image data, for example. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GWL, GIL, GBL, GCL and EBL in response to the first control signal CONT1 received from the driving controller 200. The gate driver 300 may output the gate signals to the gate lines GWL, GIL, GBL, GCL and EBL.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 generates emission signals to drive the emission lines EL in response to the fourth control signal CONT4 received from the driving controller 200. The emission driver 600 may output the emission signals to the emission lines EL.

The noise generator 700 may generate a noise signal having a noise frequency FNOISE based on a driving frequency of the display panel 100.

When the display panel 100 displays a moving image, the driving controller 200 may determine the driving frequency to a high driving frequency. When the display panel 100 displays a still image or the display panel 100 is operated in always-on mode, the driving controller 200 may determine the driving frequency to a low driving frequency.

In the illustrated embodiment, the noise generator 700 may determine the noise frequency FNOISE and output the noise frequency FNOISE to the gate driver 300. The noise generator 700 may determine a noise voltage VNOISE which represents an intensity of the noise signal and output the noise voltage VNOISE to the display panel 100.

The gate driver 300 may generate a noise control signal having the noise frequency FNOISE and output the noise control signal to the pixels through a noise gate line EBL.

Although the noise generator 700 is illustrated as a separated element in FIG. 1 for convenience of explanation, the invention may not be limited thereto. In an embodiment, the noise generator 700 and the driving controller may be unitary as one body, for example. In an alternative embodiment, the noise generator 700 may be unitary with one of the gate driver 300, the data driver 500 and the emission driver 600 as one body. In an alternative embodiment, a portion of the noise generator 700 may be unitary with one of the driving controller 200, the gate driver 300, the data driver 500 and the emission driver 600 as one body, for example. In an alternative embodiment, for example, a first portion of the noise generator 700 may be disposed in the driving controller 200 or the data driver 500 and a second portion of the noise generator 700 may be disposed in the gate driver 300 or the emission driver 600, for example.

Although the gate driver 300 is disposed at a first side (e.g., left side in FIG. 1) of the display panel 100 and the emission driver 600 is disposed at a second side (e.g., right side in FIG. 1) of the display panel 100 opposite to the first side in FIG. 1 for convenience of explanation, the invention may not be limited thereto. In an embodiment, both of the gate driver 300 and the emission driver 600 may be disposed at the first side of the display panel 100, for example. In an embodiment, the gate driver 300 and the emission driver 600 may be unitary as one body, for example.

Figure 2:
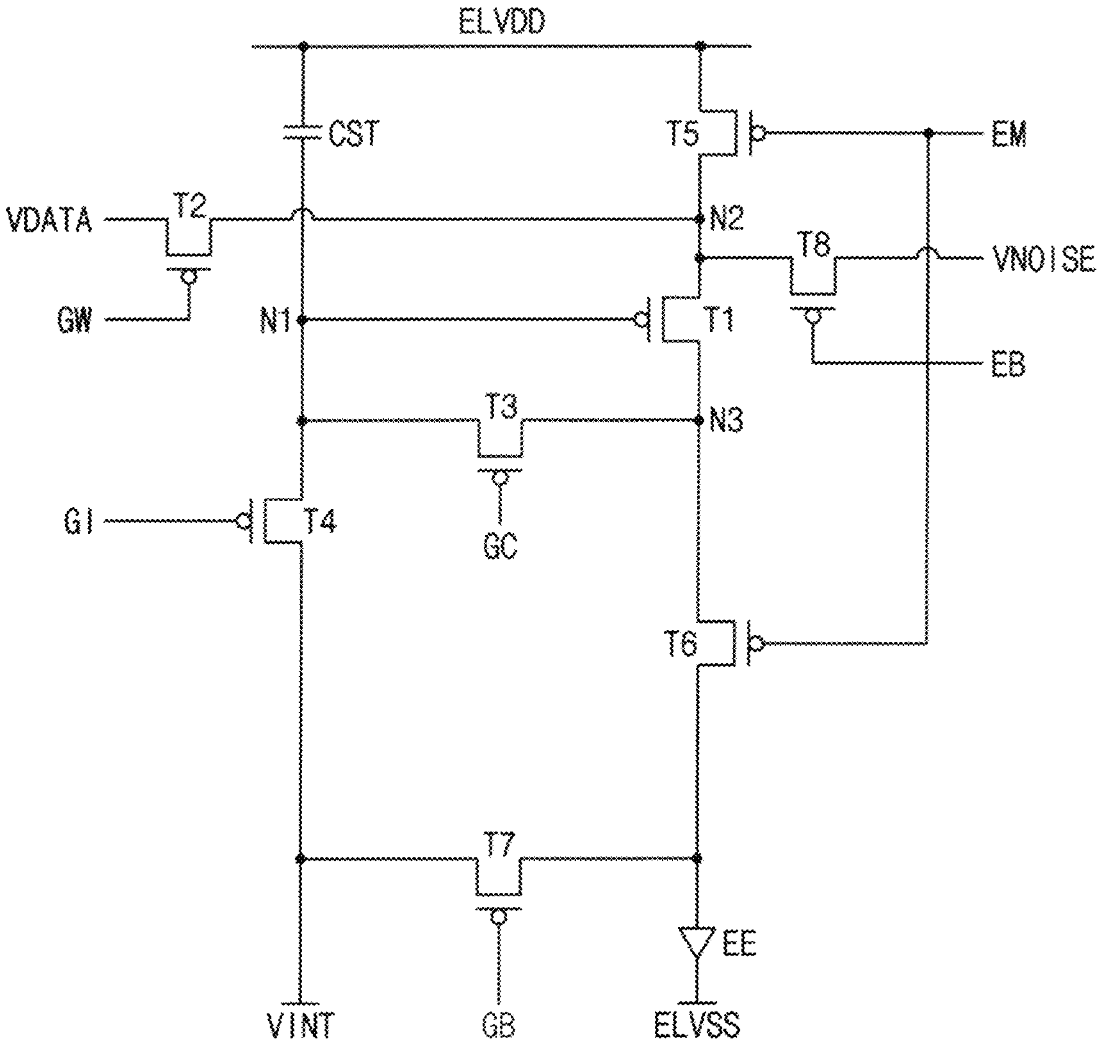
FIG. 2 is a circuit diagram illustrating a pixel of a display panel of FIG. 1.
Figure 3:
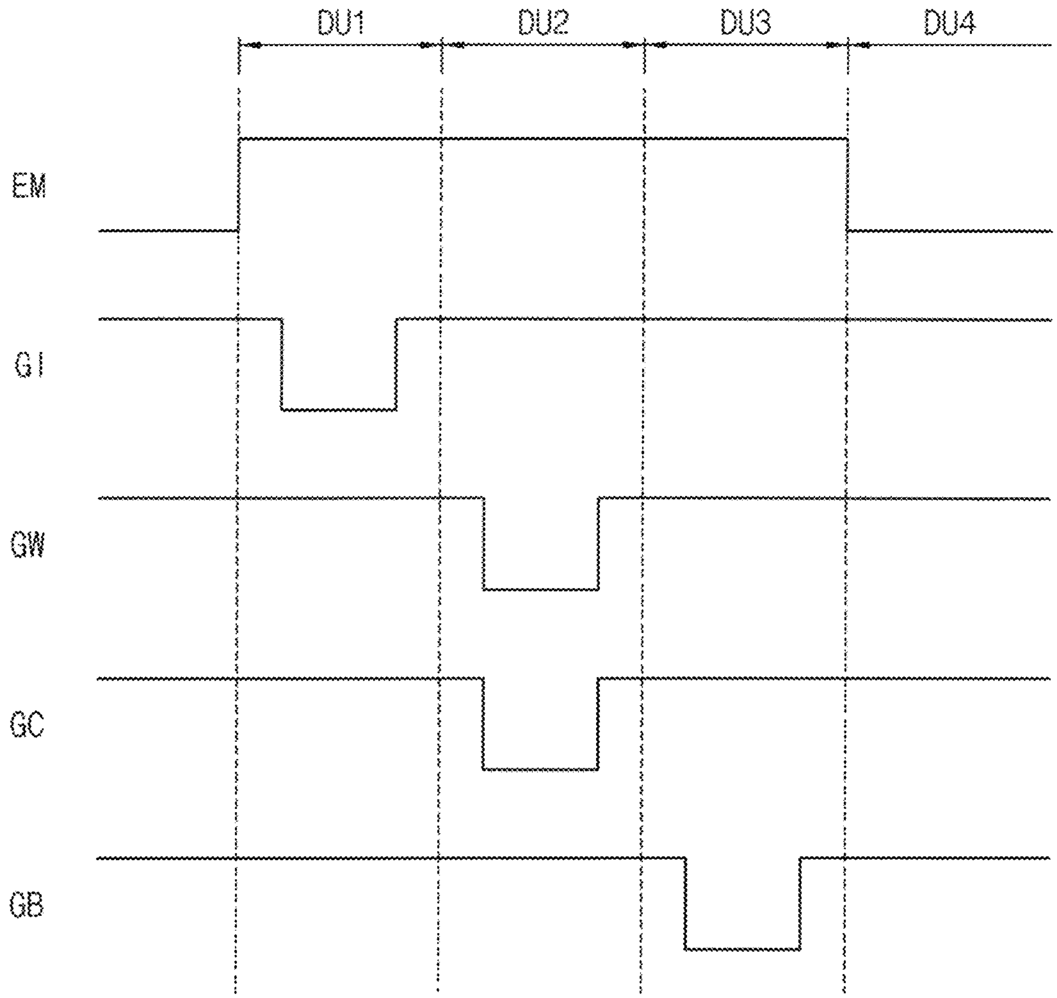
FIG. 3 is a timing diagram illustrating input signals applied to the pixel of FIG. 2.

FIG. 2 is a circuit diagram illustrating a pixel of the display panel 100 of FIG. 1. FIG. 3 is a timing diagram illustrating input signals applied to the pixel of FIG. 2.

Referring to FIGS. 1 to 3, the display panel 100 includes the plurality of the pixels. Each pixel includes a light-emitting element EE.

The pixel receives a data write gate signal GW, a compensation gate signal GC, a data initialization gate signal GI, a light-emitting element initialization gate signal GB, the noise control signal EB, the data voltage VDATA and the emission signal EM, and the light-emitting element EE of the pixel emits light corresponding to the level of the data voltage VDATA to display the image.

The pixel may include the light-emitting element EE, a driving switching element T1 and a noise switching element T8 outputting the noise signal to an input electrode of the driving switching element T1 in response to the noise control signal EB having the noise frequency FNOISE.

More specifically, for example, the pixel may include first to eighth pixel switching elements T1 to T8, a storage capacitor CST and the light-emitting element EE.

The first pixel switching element T1 includes a control electrode connected to a first node N1, an input electrode connected to a second node N2 and an output electrode connected to a third node N3.

The second pixel switching element T2 includes a control electrode receiving the data write gate signal GW, an input electrode receiving the data voltage VDATA and an output electrode connected to the second node N2.

The third pixel switching element T3 includes a control electrode receiving the compensation gate signal GC, an input electrode connected to the first node N1 and an output electrode connected to the third node N3.

Although the third pixel switching element T3 is configured as a single transistor in FIG. 2 for convenience of explanation, the third pixel switching element T3 may include two transistors (dual transistors) connected to each other in series.

The fourth pixel switching element T4 may include a control electrode receiving the data initialization gate signal GI, an input electrode receiving an initialization voltage VINT and an output electrode connected to the first node N1.

Although the fourth pixel switching element T4 is configured as a single transistor in FIG. 2 for convenience of explanation, the fourth pixel switching element T4 may include two transistors (dual transistors) connected to each other in series.

The fifth pixel switching element T5 includes a control electrode receiving the emission signal EM, an input electrode receiving a first power voltage ELVDD and an output electrode connected to the second node N2.

The sixth pixel switching element T6 includes a control electrode receiving the emission signal EM, an input electrode connected to the third node N3 and an output electrode connected to an anode electrode of the light-emitting element EE.

The seventh pixel switching element T7 includes a control electrode receiving the light-emitting element initialization gate signal GB, an input electrode receiving the initialization voltage VINT and an output electrode connected to the anode electrode of the light-emitting element EE.

The eighth pixel switching element T8 includes a control electrode receiving the noise control signal EB, an input electrode receiving the noise signal VNOISE and an output electrode connected to the second node N2.

In an embodiment, the first to eighth pixel switching elements T1 to T8 may be P-type thin film transistors ("TFTs"), for example. The control electrodes of the first to eighth pixel switching elements T1 to T8 may be gate electrodes, the input electrodes of the first to eighth pixel switching elements T1 to T8 may be source electrodes and the output electrodes of the first to eighth pixel switching elements T1 to T8 may be drain electrodes. However, the invention is not limited thereto, and in another embodiment, the input electrodes of the first to eighth pixel switching elements T1 to T8 may be drain electrodes and the output electrodes of the first to eighth pixel switching elements T1 to T8 may be source electrodes.

The storage capacitor CST includes a first electrode receiving the first power voltage ELVDD and a second electrode connected to the first node N1.

The light-emitting element EE includes the anode electrode and a cathode electrode receiving a second power voltage ELVSS. An amplitude of the second power voltage ELVSS may be less than that of the first power voltage ELVDD.

Herein, the first pixel switching element T1 may be also referred to as the driving switching element and the eighth pixel switching element T8 may be also referred to as the noise switching element.

In FIG. 3, during a first duration DU1, the first node N1 and the storage capacitor CST may be initialized in response to the data initialization gate signal GI. During a second duration DU2, a threshold voltage |VTH| of the first pixel switching element T1 may be compensated and the data voltage VDATA of which the threshold voltage |VTH| is compensated may be written to the first node N1 in response to the data write gate signals GW and the compensation gate signal GC. During a third duration DU3, the anode electrode of the light-emitting element EE may be initialized in response to the light-emitting element initialization gate signal GB. During a fourth duration DU4, the light-emitting element EE may emit the light in response to the emission signal EM so that the display panel 100 may display the image.

In the first duration DU1, the data initialization gate signal GI may have an active level. In an embodiment, the active level of the data initialization gate signal GI may be a low level, for example. When the data initialization gate signal GI has the active level, the fourth pixel switching element T4 may be turned on so that the initialization voltage VINT may be applied to the first node N1.

In the second duration DU2, the data write gate signal GW and the compensation gate signal GC may have active levels. In an embodiment, the active level of the data write gate signal GW may be a low level and the active level of the compensation gate signal GC may be a low level, for example. When the data write gate signal GW and the compensation gate signal GC have the active levels, the second pixel switching element T2 and the third pixel switching element T3 may be turned on. In addition, the first pixel switching element T1 may be turned on in response to the initialization voltage VINT.

In an embodiment, the control electrode of the second pixel switching element T2 may be connected to the control electrode of the third pixel switching element T3.

Although the data write gate signal GW and the compensation gate signal GC have the same timing in the illustrated embodiment, the invention may not be limited thereto. In an embodiment, a portion of the active period of the data write gate signal GW and a portion of the active period of the compensation gate signal GC may overlap each other, but the data write gate signal GW and the compensation gate signal GC may not have the same timing, for example.

A voltage which is obtained by subtracting an absolute value |VTH| of the threshold voltage of the first pixel switching element T1 from the data voltage VDATA may be charged at the first node N1 along a path generated by the first to third pixel switching elements T1, T2 and T3.

In the third duration DU3, the light-emitting element initialization gate signal GB may have an active level. In an embodiment, the active level of the light-emitting element initialization gate signal GB may be a low level, for example. When the light-emitting element initialization gate signal GB has the active level, the seventh pixel switching element T7 may be turned on so that the initialization voltage VINT may be applied to the anode electrode of the light-emitting element EE.

In the fourth duration DU4, the emission signal EM may have the active level. In an embodiment, the active level of the emission signal EM may be a low level. When the emission signal EM has the active level, the fifth pixel switching element T5 and the sixth pixel switching element T6 may be turned on, for example. In addition, the first pixel switching element T1 may be turned on by the data voltage VDATA.

A driving current may flow through the fifth pixel switching element T5, the first pixel switching element T1 and the sixth pixel switching element T6 to drive the light-emitting element EE. An intensity of the driving current may be determined by the level of the data voltage VDATA. A luminance of the light-emitting element EE may be determined by the intensity of the driving current.

Figure 4:
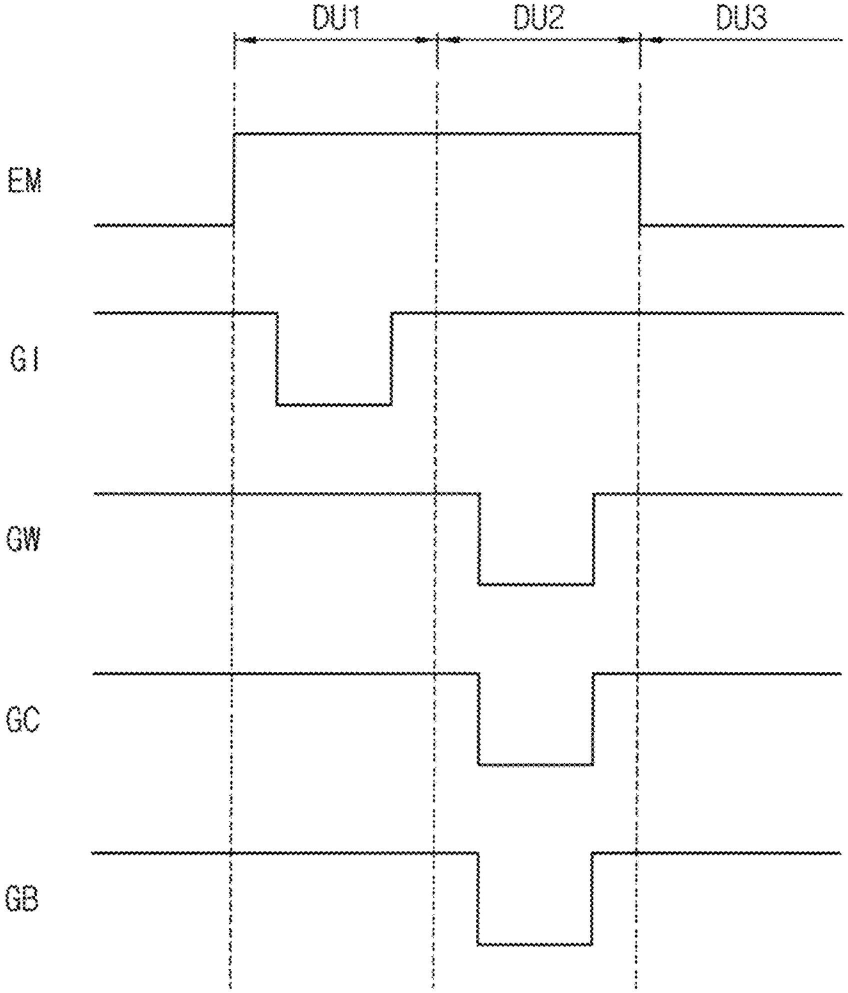
FIG. 4 is a timing diagram illustrating an embodiment of input signals applied to a pixel of a display panel of a display apparatus according to the invention.

FIG. 4 is a timing diagram illustrating input signals applied to a pixel of a display panel of a display apparatus according to the invention.

The display apparatus in the illustrated embodiment is substantially the same as the display apparatus of the previous embodiment explained referring to FIGS. 1 to 3 except for timings of the gate signals. Thus, the same reference numerals will be used to refer to the same or like parts as those described in the previous embodiment of FIGS. 1 to 3 and any repetitive explanation concerning the above elements will be omitted.

Referring to FIGS. 1, 2 and 4, the display panel 100 includes the plurality of the pixels. Each pixel includes a light-emitting element EE.

The pixel receives a data write gate signal GW, a compensation gate signal GC, a data initialization gate signal GI, a light-emitting element initialization gate signal GB, the noise control signal EB, the data voltage VDATA and the emission signal EM and the light-emitting element EE of the pixel emits light corresponding to the level of the data voltage VDATA to display the image.

In the illustrated embodiment, an active period of the data initialization gate signal (also referred to as a first gate signal) GI applied to a control electrode of the fourth pixel switching element T4 and an active period of the data write gate signal (also referred to as a second gate signal) GW applied to a control electrode of the second pixel switching element T2 may have different timings from each other.

The active period of the second gate signal GW and an active period of the light-emitting element initialization gate signal (also referred to as a third gate signal) GB applied to a control electrode of the seventh pixel switching element T7 may have substantially the same timing.

In an embodiment, the control electrode of the second pixel switching element T2 may be connected to the control electrode of the seventh pixel switching element T7.

In FIG. 4, during a first duration DU1, the first node N1 and the storage capacitor CST may be initialized in response to the data initialization gate signal GI. During a second duration DU2, a threshold voltage |VTH| of the first pixel switching element T1 may be compensated and the data voltage VDATA of which the threshold voltage |VTH| is compensated may be written to the first node N1 in response to the data write gate signals GW and the compensation gate signal GC. During the second duration DU2, the anode electrode of the light-emitting element EE may be initialized in response to the light-emitting element initialization gate signal GB. During a third duration DU3, the light-emitting element EE may emit the light in response to the emission signal EM so that the display panel 100 may display the image.

Figure 5:
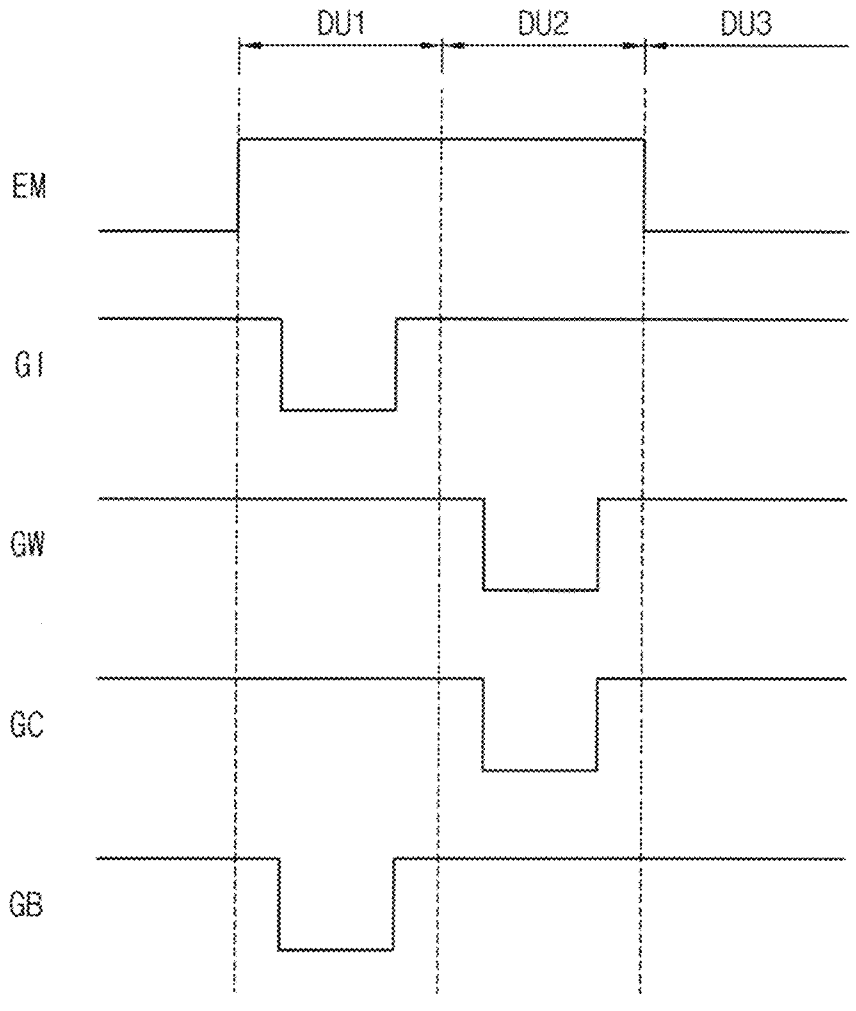
FIG. 5 is a timing diagram illustrating an embodiment of input signals applied to a pixel of a display panel of a display apparatus according to the invention.

FIG. 5 is a timing diagram illustrating an embodiment of input signals applied to a pixel of a display panel of a display apparatus according to the invention.

The display apparatus in the illustrated embodiment is substantially the same as the display apparatus of the previous embodiment explained referring to FIGS. 1 to 3 except for timings of the gate signals. Thus, the same reference numerals will be used to refer to the same or like parts as those described in the previous embodiment of FIGS. 1 to 3 and any repetitive explanation concerning the above elements will be omitted.

Referring to FIGS. 1, 2 and 5, the display panel 100 includes the plurality of the pixels. Each pixel includes a light-emitting element EE.

The pixel receives a data write gate signal GW, a compensation gate signal GC, a data initialization gate signal GI, a light-emitting element initialization gate signal GB, the noise control signal EB, the data voltage VDATA and the emission signal EM and the light-emitting element EE of the pixel emits light corresponding to the level of the data voltage VDATA to display the image.

In the illustrated embodiment, an active period of a first gate signal GI applied to a control electrode of the fourth pixel switching element T4 and an active period of a second gate signal GW applied to a control electrode of the second pixel switching element T2 may have different timings from each other.

The active period of the first gate signal GI and an active period of a third gate signal GB applied to a control electrode of the seventh pixel switching element T7 may have substantially the same timing.

In the illustrated embodiment, the control electrode of the fourth pixel switching element T4 may be connected to the control electrode of the seventh pixel switching element T7.

In FIG. 5, during a first duration DU1, the first node N1 and the storage capacitor CST may be initialized in response to the data initialization gate signal GI. During the first duration DU1, the anode electrode of the light-emitting element EE may be initialized in response to the light-emitting element initialization gate signal GB. During a second duration DU2, a threshold voltage |VTH| of the first pixel switching element T1 may be compensated and the data voltage VDATA of which the threshold voltage |VTH| is compensated may be written to the first node N1 in response to the data write gate signals GW and the compensation gate signal GC. During a third duration DU3, the light-emitting element EE may emit the light in response to the emission signal EM so that the display panel 100 may display the image.

Figure 6:
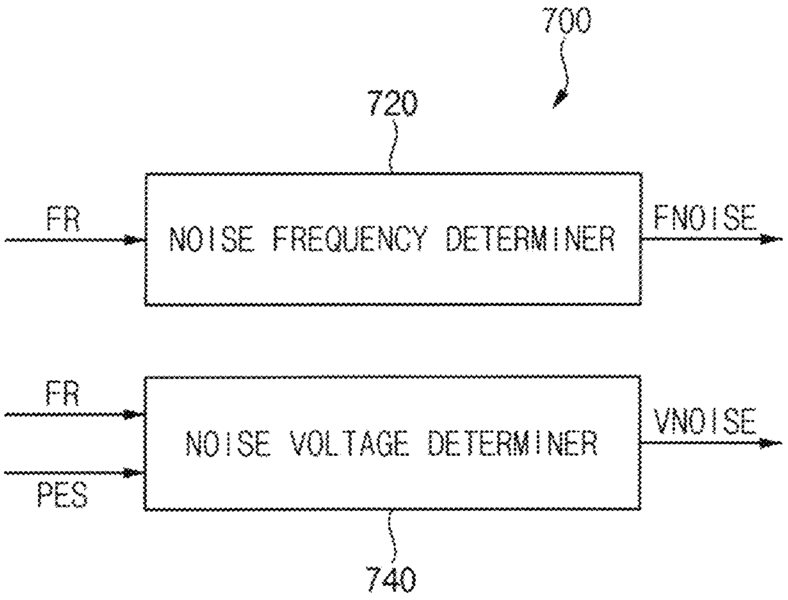
FIG. 6 is a block diagram illustrating a noise generator of FIG. 1.
Figure 7:
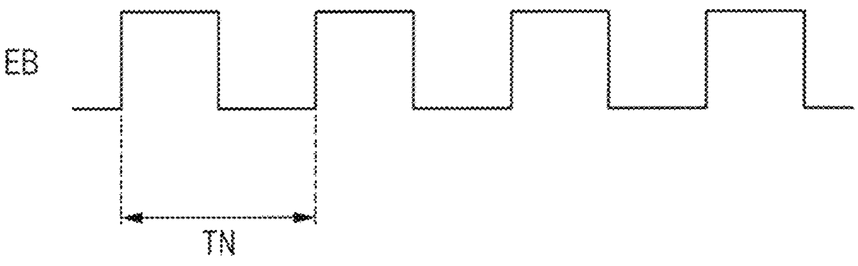
FIG. 7 is a timing diagram illustrating a noise control signal having a noise frequency determined by a noise frequency determiner of FIG. 6.

FIG. 6 is a block diagram illustrating the noise generator 700 of FIG. 1. FIG. 7 is a timing diagram illustrating the noise control signal EB having the noise frequency FNOISE determined by a noise frequency determiner 720 of FIG. 6.

Referring to FIGS. 1 to 7, the noise generator 700 may include a noise frequency determiner 720 and a noise voltage determiner 740.

The noise frequency determiner 720 may determine the noise frequency FNOISE based on the driving frequency FR.

In an embodiment, as the driving frequency FR decreases, the noise frequency FNOISE may decrease, for example. When the noise frequency FNOISE have a value corresponding to the driving frequency FR, the flicker may be reduced. Thus, as the driving frequency FR decreases, the noise frequency FNOISE may decrease.

In addition, the noise frequency FNOISE may be equal to or greater than the driving frequency FR.

As shown in FIG. 7, the noise control signal EB may be a square wave signal having a fixed frequency (e.g. FNOISE). A cycle TN of the noise control signal EB may be represented as a reciprocal (1/FNOISE) of the noise frequency.

The noise voltage determiner 740 may determine the noise voltage VNOISE based on the driving frequency FR and the end-to-start luminance ratio PES of the display panel 100. The noise voltage VNOISE may represent an intensity of the noise signal applied to the input electrode of the driving switching element. When the noise voltage VNOISE is great, it may mean that a degree of flicker compensation is great.

A current leakage may be generated along a path generated by the third pixel switching element T3 and the fourth pixel switching element T4 of the pixel and an amount of the current leakage may increase as the driving frequency FR decreases. When the luminance of the pixel decreases due to the current leakage, it may appear as flickering when the data voltage VDATA is refreshed in a next frame, and in this way, the current leakage may generate the flicker.

In an embodiment, as the driving frequency FR decreases, the noise voltage VNOISE may be set to be increased, for example. When the driving frequency FR decreases, the amount of the current leakage may increase. Thus, as the driving frequency FR decreases, the noise voltage VNOISE may be set to be increased to increase the degree of the flicker compensation.

In addition, as the end-to-start luminance ratio PES of the display panel 100 decreases, the noise voltage VNOISE may be set to be increased. When the end-to-start luminance ratio PES of the display panel 100 is low, it means that the luminance at an end point is significantly reduced with respect to the luminance at a start point so that the amount of the current leakage may be great. Thus, as the end-to-start luminance ratio PES of the display panel 100 decreases, the noise voltage VNOISE may be set to be increased to increase the degree of the flicker compensation.

The end-to-start luminance ratio PES may be varied according to a structure of the display panel 100, a structure of the pixel and a structure of signal wirings. The end-to-start luminance ratio PES may be an electrical characteristic of the display panel 100. Thus, the noise voltage VNOISE may be determined by reflecting the end-to-start luminance ratio PES of the display panel 100.

Figure 8:
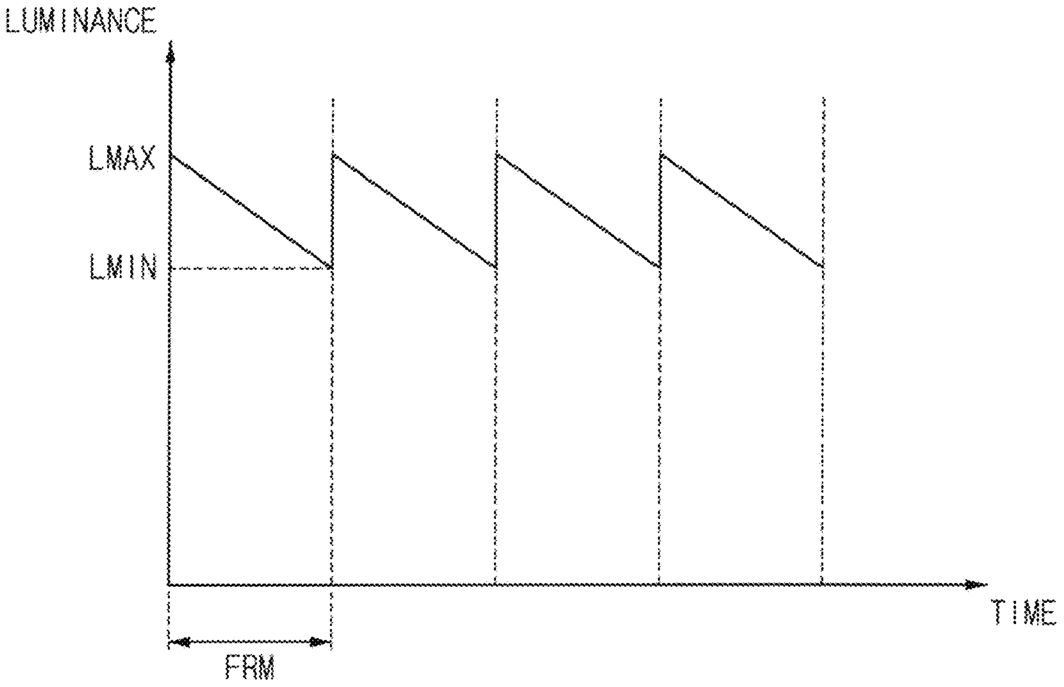
FIG. 8 is a graph illustrating a comparative embodiment of a luminance of a pixel of a display panel.
Figure 9:
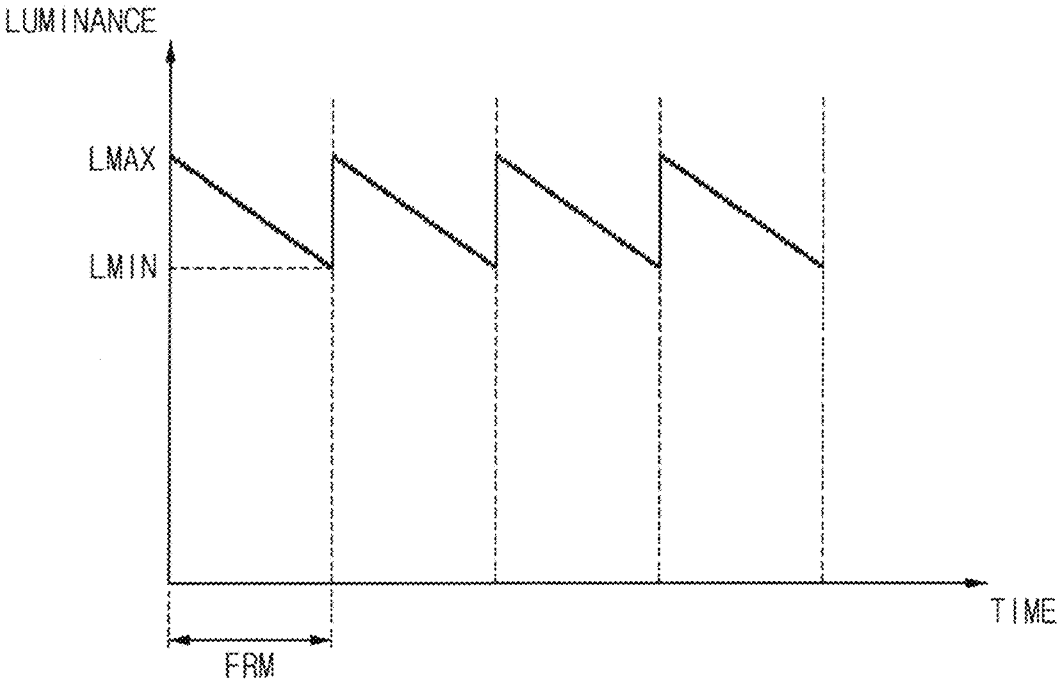
FIG. 9 is a graph illustrating a comparative embodiment of a luminance of a pixel of a display panel.
Figure 10:
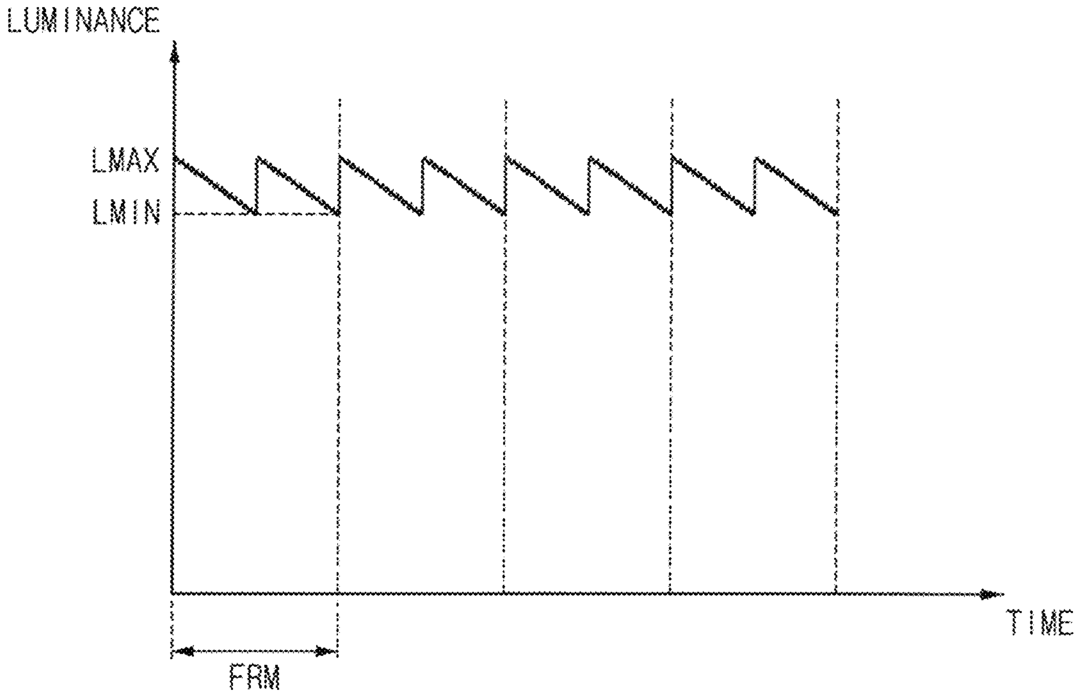
FIG. 10 is a graph illustrating a luminance of a pixel of the display panel of FIG. 1.
Figure 11:
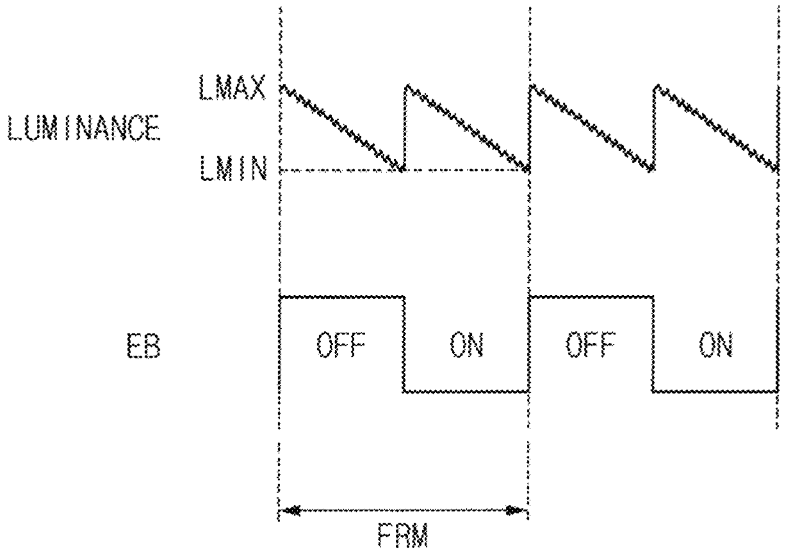
FIG. 11 is a graph illustrating a luminance of a pixel of the display panel of FIG. 1 when the noise frequency determined by a noise frequency determiner of FIG. 6 is substantially the same as a driving frequency of the display panel of FIG. 1.
Figure 12:
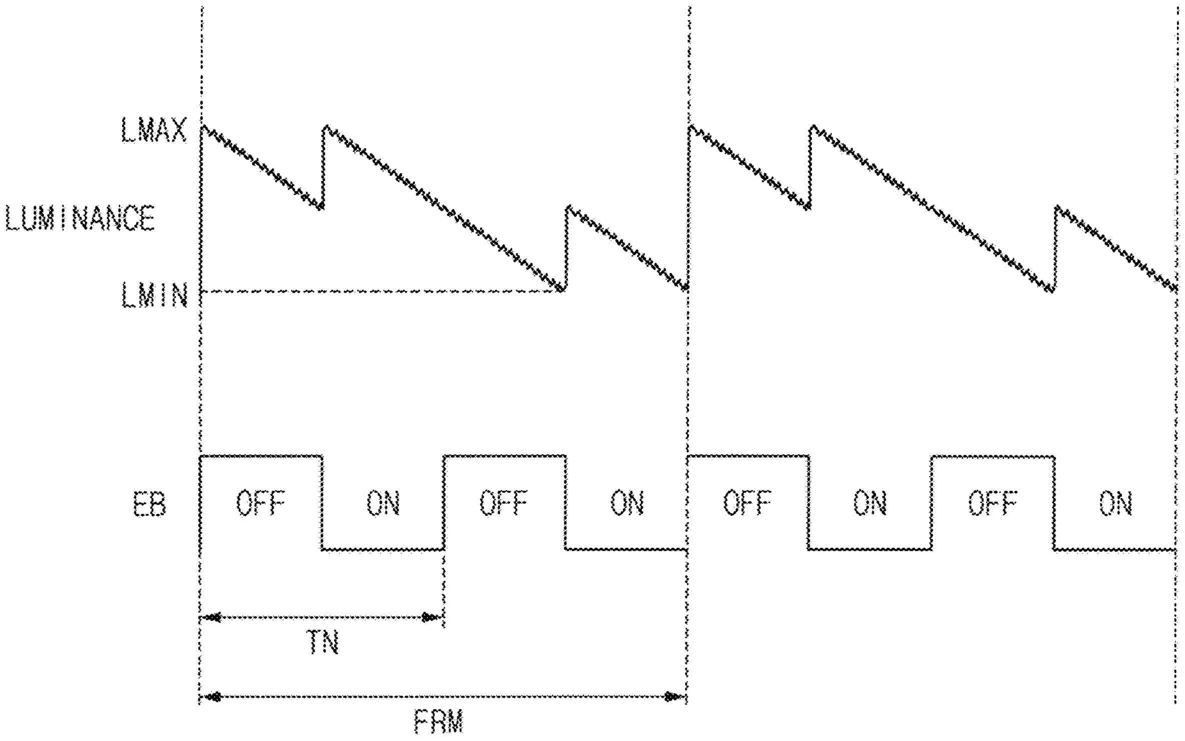
FIG. 12 is a graph illustrating a luminance of a pixel of the display panel of FIG. 1 when the noise frequency determined by a noise frequency determiner of FIG. 6 is twice the driving frequency of the display panel of FIG. 1.

FIG. 8 is a graph illustrating a comparative embodiment of a luminance of a pixel of a display panel. FIG. 9 is a graph illustrating a comparative embodiment of a luminance of a pixel of a display panel. FIG. 10 is a graph illustrating a luminance of a pixel of the display panel of FIG. 1. FIG. 11 is a graph illustrating a luminance of a pixel of the display panel of FIG. 1 when the noise frequency determined by a noise frequency determiner of FIG. 6 is substantially the same as a driving frequency of the display panel of FIG. 1. FIG. 12 is a graph illustrating a luminance of a pixel of the display panel of FIG. 1 when the noise frequency determined by a noise frequency determiner of FIG. 6 is twice the driving frequency of the display panel of FIG. 1.

FIG. 8 represents a luminance waveform of a pixel to which a noise signal is not applied. FIG. 9 represents a luminance waveform of a pixel to which a noise signal not having a periodicity is applied. FIG. 10 represents a luminance waveform of a pixel to which a noise signal having a periodicity is applied.

In FIG. 8, a luminance of a start point of a frame FRM may be a maximum luminance LMAX and a luminance of an end point of the frame FRM may be a minimum LMIN. The luminance may be decreased in the frame FRM due to the current leakage of the switching elements (e.g., T3 and/or T4 in FIG. 2) in the pixel.

When the display panel 100 is driven at a low driving frequency, a length of the frame FRM increases so that an amount of the current leakage may increase and a difference between the maximum luminance LMAX and the minimum luminance LMIN may increase. In FIG. 8, the flicker may be shown to a user due to the difference between the maximum luminance LMAX and the minimum luminance LMIN.

In FIG. 9, the noise signal not having the periodicity is applied to the luminance so that the luminance may have a noise component. However, the luminance waveform of FIG. 9 is generally the same as the luminance waveform of FIG. 8. In FIG. 9, the flicker may be shown to a user due to the difference between the maximum luminance LMAX and the minimum luminance LMIN.

In FIG. 10, the noise signal having the periodicity is applied to the luminance. The noise signal may not be applied to the luminance in a first half of the frame FRM, but the noise signal including the luminance may be applied to the luminance in a second half of the frame FRM so that the luminance may be increased to a level close to the maximum luminance LMAX at a start point of the second half of the frame FRM. In FIG. 10, the noise signal having the periodicity is applied to the luminance so that the minimum luminance LMIN may be increased comparing to the minimum luminance LMIN of FIG. 8 and the minimum luminance LMIN of FIG. 9. Thus, the flicker may be reduced in FIG. 10.

In FIG. 11, the noise frequency FNOISE of the noise control signal EB may be set to be substantially the same as the driving frequency FR of the display panel 100. In an embodiment, when the driving frequency FR of the display panel 100 is about 30 hertz (Hz), the noise frequency FNOISE of the noise control signal EB may be about 30 Hz, for example. In addition, when the driving frequency FR of the display panel 100 is about 15 Hz, the noise frequency FNOISE of the noise control signal EB may be about 15 Hz.

In FIG. 12, the noise frequency FNOISE of the noise control signal EB may be set to be greater than the driving frequency FR of the display panel 100. In FIG. 12, for example, the noise frequency FNOISE of the noise control signal EB may be twice the driving frequency FR of the display panel 100. Thus, the cycle TN of the noise control signal EB may be half the frame FRM which is a driving cycle of the display panel 100. In an embodiment, when the driving frequency FR of the display panel 100 is about 30 Hz, the noise frequency FNOISE of the noise control signal EB may be about 60 Hz, for example. In addition, when the driving frequency FR of the display panel 100 is about 15

Hz, the noise frequency FNOISE of the noise control signal EB may be about 30 Hz. In FIGS. 11 and 12, the minimum luminance LMIN may be increased comparing to the minimum luminance LMIN of FIG. 8 and the minimum luminance LMIN of FIG. 9 due to the noise signal having the periodicity so that the flicker may be reduced in FIGS. 11 and 12.

Figures 13, 14:
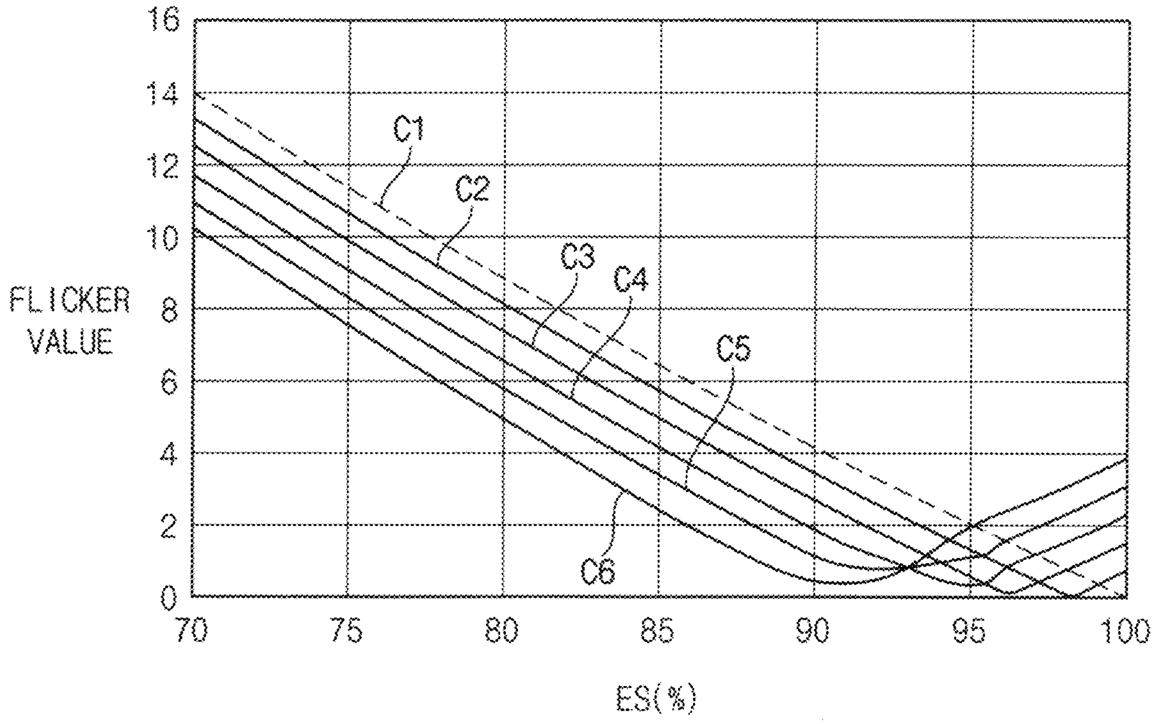
FIG. 13 is a graph illustrating flicker values according to a noise voltage determined by a noise voltage determiner of FIG. 6 and an end-to-start luminance ratio.
FIG. 14 is a table illustrating a signal-to-noise ratio according to the end-to-start luminance ratio.

FIG. 13 is a graph illustrating flicker values according to the noise voltage VNOISE determined by the noise voltage determiner 740 of FIG. 6 and the end-to-start luminance ratio ES. FIG. 14 is a table illustrating a signal-to-noise ratio SNR according to the end-to-start luminance ratio ES.

Referring to FIGS. 1 to 14, when the end-to-start luminance ratio ES is high, it means that the current leakage is little. Thus, when the end-to-start luminance ratio ES is high, the intensity (noise voltage VNOISE) of the noise signal may be set to be low so that the degree of the flicker compensation may be set to be low. In contrast, when the end-to-start luminance ratio ES is low, it means that the current leakage is great. Thus, when the end-to-start luminance ratio ES is low, the intensity (noise voltage VNOISE) of the noise signal may be set to be high so that the degree of the flicker compensation may be set to be high.

C1 in FIG. 13 represents a flicker value according to the end-to-start luminance ratio ES when there is no noise. C2 in FIG. 13 represents a flicker value according to the end-to-start luminance ratio ES when the signal-to-noise ratio is about 96.78 percent (%). C3 in FIG. 13 represents a flicker value according to the end-to-start luminance ratio ES when the signal-to-noise ratio is about 90.77%. C4 in FIG. 13 represents a flicker value according to the end-to-start luminance ratio ES when the signal-to-noise ratio is about 87.27%. C5 in FIG. 13 represents a flicker value according to the end-to-start luminance ratio ES when the signal-to-noise ratio is about 84.76%. C6 in FIG. 13 represents a flicker value according to the end-to-start luminance ratio ES when the signal-to-noise ratio is about 82.84%. When the signal-to-noise ratio is little, it means that the intensity (noise voltage VNOISE) of the noise signal is set to be high.

As shown in FIG. 13, when the end-to-start luminance ratio ES is little, it means that the current leakage is great. Thus, as the end-to-start luminance ratio ES decreases, the signal-to-noise ratio may be decreased (moving from C1 to C6 direction) to decrease the flicker value so that the flicker value may be minimized. Thus, as moving from C1 to C6, the lowest point (a point where the flicker value is minimum) of the graph moves from right (ES 100%) to left (ES 70%).

FIG. 14 represents an example for properly controlling the signal-to-noise ratio SNR according to the end-to-start luminance ratio ES. In an embodiment, when the end-to-start luminance ratio ES is about 99, the noise may be set to zero decibel (dB), for example. In an embodiment, when the end-to-start luminance ratio ES is about 98, the signal-to-noise ratio SNR may be set to about 85.3 dB, for example. In an embodiment, when the end-to-start luminance ratio ES is about 96, the signal-to-noise ratio SNR may be set to about 87.8 dB, for example. In an embodiment, when the end-to-start luminance ratio ES is about 90, the signal-to-noise ratio SNR may be set to about 83.3 dB, for example. In an embodiment, when the end-to-start luminance ratio ES is about 80, the signal-to-noise ratio SNR may be set to be less than about 80 dB, for example.

In the illustrated embodiment, when an image displayed on the display panel 100 is a static image or the display panel 100 is operated in always-on mode, the driving frequency FR of the display panel 100 may be decreased to reduce a power consumption of the display apparatus.

The noise signal having a periodicity may be applied to the input electrode of the driving switching element T1 of the pixel so that the flicker due to the current leakage may be reduced when the display panel 100 is driven at the low driving frequency. The flicker may be reduced so that the display quality of the display panel 100 may be enhanced.

Figure 15:
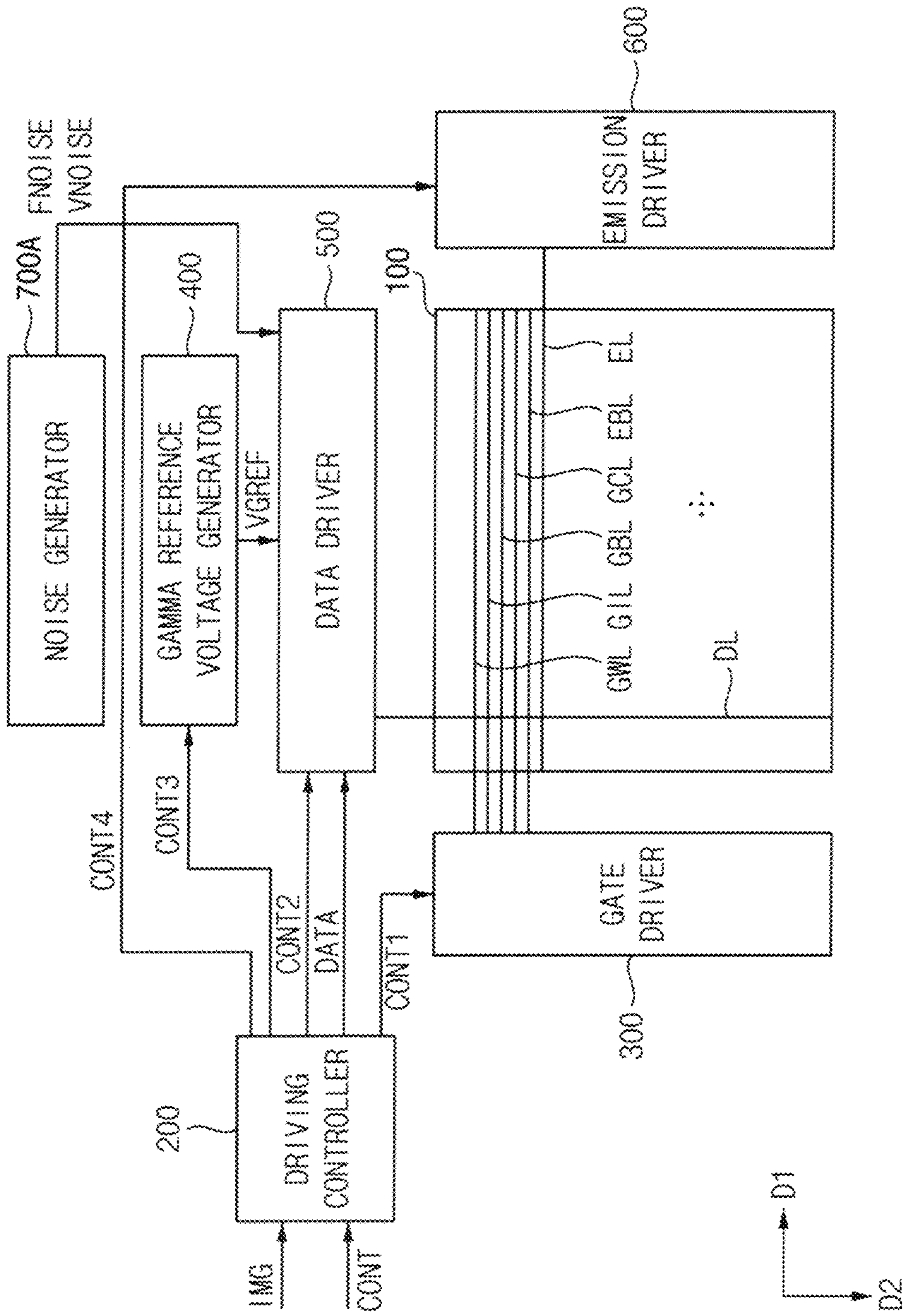
FIG. 15 is a block diagram illustrating an embodiment of a display apparatus according to the invention.
Figure 16:
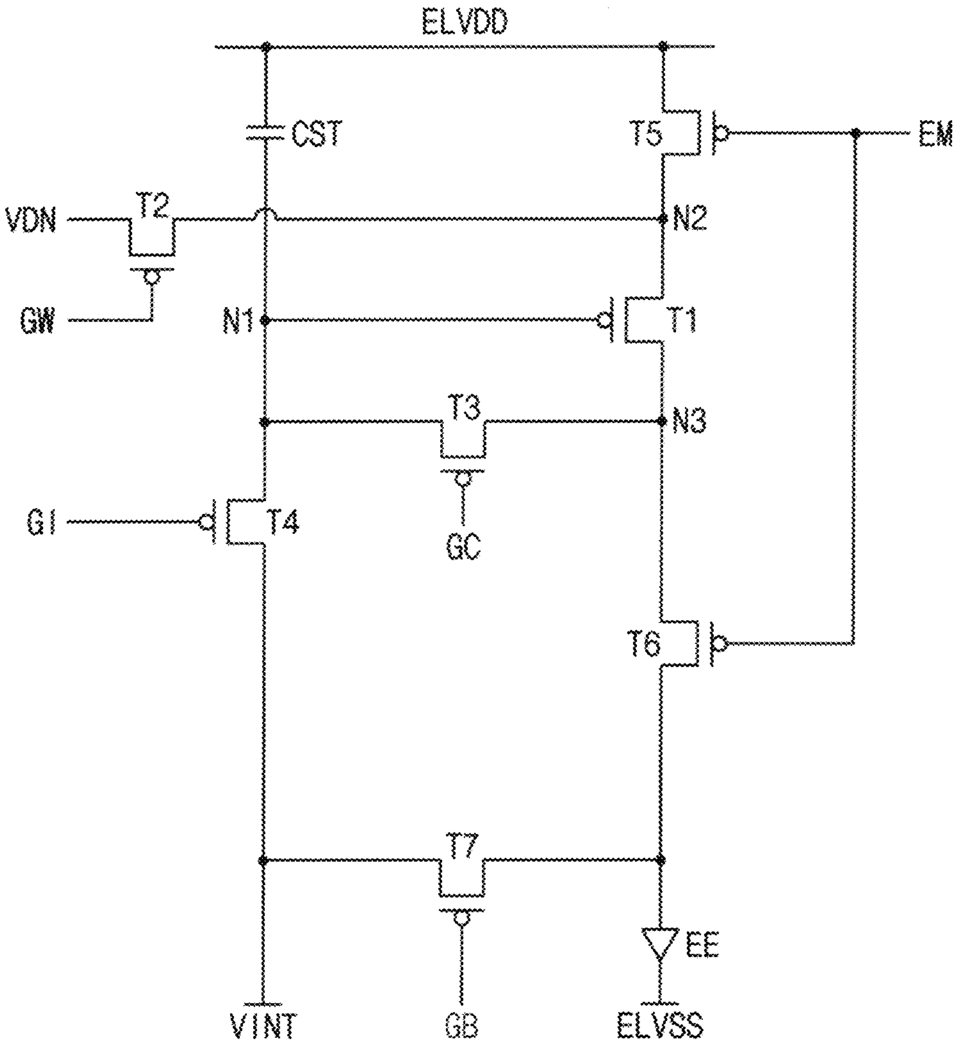
FIG. 16 is a circuit diagram illustrating a pixel of a display panel of FIG. 15.

FIG. 15 is a block diagram illustrating an embodiment of a display apparatus according to the invention. FIG. 16 is a circuit diagram illustrating a pixel of a display panel 100 of FIG. 15.

The display apparatus in the illustrated embodiment is substantially the same as the display apparatus of the previous embodiment explained referring to FIGS. 1 to 14 except for the structure of the noise generator and the structure of the pixel. Thus, the same reference numerals will be used to refer to the same or like parts as those described in the previous embodiment of FIGS. 1 to 14 and any repetitive explanation concerning the above elements will be omitted.

Referring to FIGS. 15 and 16, in the illustrated embodiment, the noise generator 700A may determine the noise frequency FNOISE and the noise voltage VNOISE and output the noise frequency FNOISE and the noise voltage VNOISE to the data driver 500.

The data driver 500 may output a data voltage VDN including a noise component to the pixel based on the noise frequency FNOISE and the noise voltage VNOISE.

The pixel may include first to seventh pixel switching elements T1 to T7, a storage capacitor CST and a light-emitting element EE.

The pixel includes the first pixel switching element T1 including a control electrode connected to a first node N1, an input electrode connected to a second node N2 and an output electrode connected to a third node N3, the second pixel switching element T2 including a control electrode receiving the data write gate signal GW, an input electrode receiving the noise data voltage VDN and an output electrode connected to the second node N2, the third pixel switching element T3 including a control electrode receiving the compensation gate signal GC, an input electrode connected to the first node N1 and an output electrode connected to the third node N3, the fourth pixel switching element T4 including a control electrode receiving the data initialization gate signal GI, an input electrode receiving an initialization voltage VINT and an output electrode connected to the first node N1, the fifth pixel switching element T5 including a control electrode receiving the emission signal EM, an input electrode receiving a first power voltage ELVDD and an output electrode connected to the second node N2, the sixth pixel switching element T6 including a control electrode receiving the emission signal EM, an input electrode connected to the third node N3 and an output electrode connected to an anode electrode of the light-emitting element EE and the seventh pixel switching element T7 including a control electrode receiving the light-emitting element initialization gate signal GB, an input electrode receiving the initialization voltage VINT and an output electrode connected to the anode electrode of the light-emitting element EE. The pixel may further include the light-emitting element EE including the anode electrode and a cathode electrode receiving a second power voltage ELVSS.

In the illustrated embodiment, the pixel may include a data writing switching element T2 outputting the noise data voltage VDN which is a sum of the data voltage and the noise signal to the input electrode of the driving switching element T1 in response to the data write gate signal GW. In an embodiment, the driving switching element may be the first pixel switching element T1 and the data writing switching element may be the second pixel switching element T2, for example.

In the illustrated embodiment, instead of including an addition noise switching element T8 for applying the noise signal to the driving switching element T1, the data driver 500 may output the noise data voltage VDN which is the sum of the data voltage and the noise signal to the input electrode of the driving switching element T1.

In the illustrated embodiment, when an image displayed on the display panel 100 is a static image or the display panel 100 is operated in always-on mode, the driving frequency FR of the display panel 100 may be decreased to reduce a power consumption of the display apparatus.

The noise signal having a periodicity may be applied to the input electrode of the driving switching element T1 of the pixel so that the flicker due to the current leakage may be reduced when the display panel 100 is driven at the low driving frequency. The flicker may be reduced so that the display quality of the display panel 100 may be enhanced.

Figure 17:
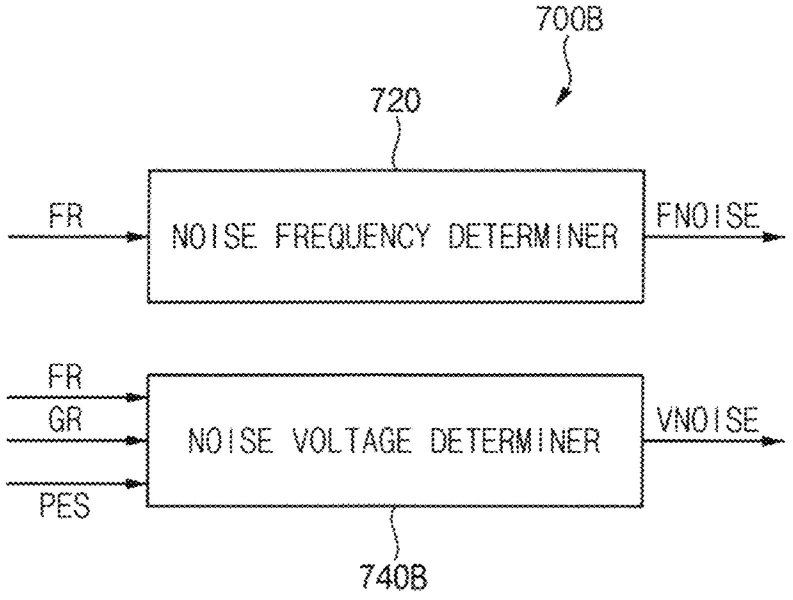
FIG. 17 is a block diagram illustrating an embodiment of a noise generator of a display apparatus according to the invention.

FIG. 17 is a block diagram illustrating an embodiment of a noise generator 700B of a display apparatus according to the invention.

The display apparatus in the illustrated embodiment is substantially the same as the display apparatus of the previous embodiment explained referring to FIGS. 1 to 14 except for the structure and the operation of the noise generator. Thus, the same reference numerals will be used to refer to the same or like parts as those described in the previous embodiment of FIGS. 1 to 14 and any repetitive explanation concerning the above elements will be omitted.

Referring to FIG. 17, in the illustrated embodiment, the noise generator 700B may include a noise frequency determiner 720 and a noise voltage determiner 740B.

The noise frequency determiner 720 may determine the noise frequency FNOISE based on the driving frequency FR.

In an embodiment, as the driving frequency FR decreases, the noise frequency FNOISE may decrease, for example. When the noise frequency FNOISE have a value corresponding to the driving frequency FR, the flicker may be reduced. Thus, as the driving frequency FR decreases, the noise frequency FNOISE may decrease.

The noise voltage determiner 740B may determine the noise voltage VNOISE based on the driving frequency FR, the end-to-start luminance ratio PES of the display panel 100 and grayscale data GR of the input image data IMG.

The noise voltage VNOISE may be determined as a ratio between the grayscale data and the noise voltage VNOISE so that the noise voltage determiner 740B may determine the noise voltage VNOISE using the grayscale data GR as well as the driving frequency FR and the end-to-start luminance ratio PES of the display panel 100.

In embodiments, the intensity of the noise signal may be defined as the signal-to-noise ratio so that the noise voltage VNOISE may increase as the grayscale data GR increases.

In the illustrated embodiment, when an image displayed on the display panel 100 is a static image or the display panel 100 is operated in always-on mode, the driving frequency FR of the display panel 100 may be decreased to reduce a power consumption of the display apparatus.

The noise signal having a periodicity may be applied to the input electrode of the driving switching element T1 of the pixel so that the flicker due to the current leakage may be reduced when the display panel 100 is driven at the low driving frequency. The flicker may be reduced so that the display quality of the display panel 100 may be enhanced.

Figure 18:
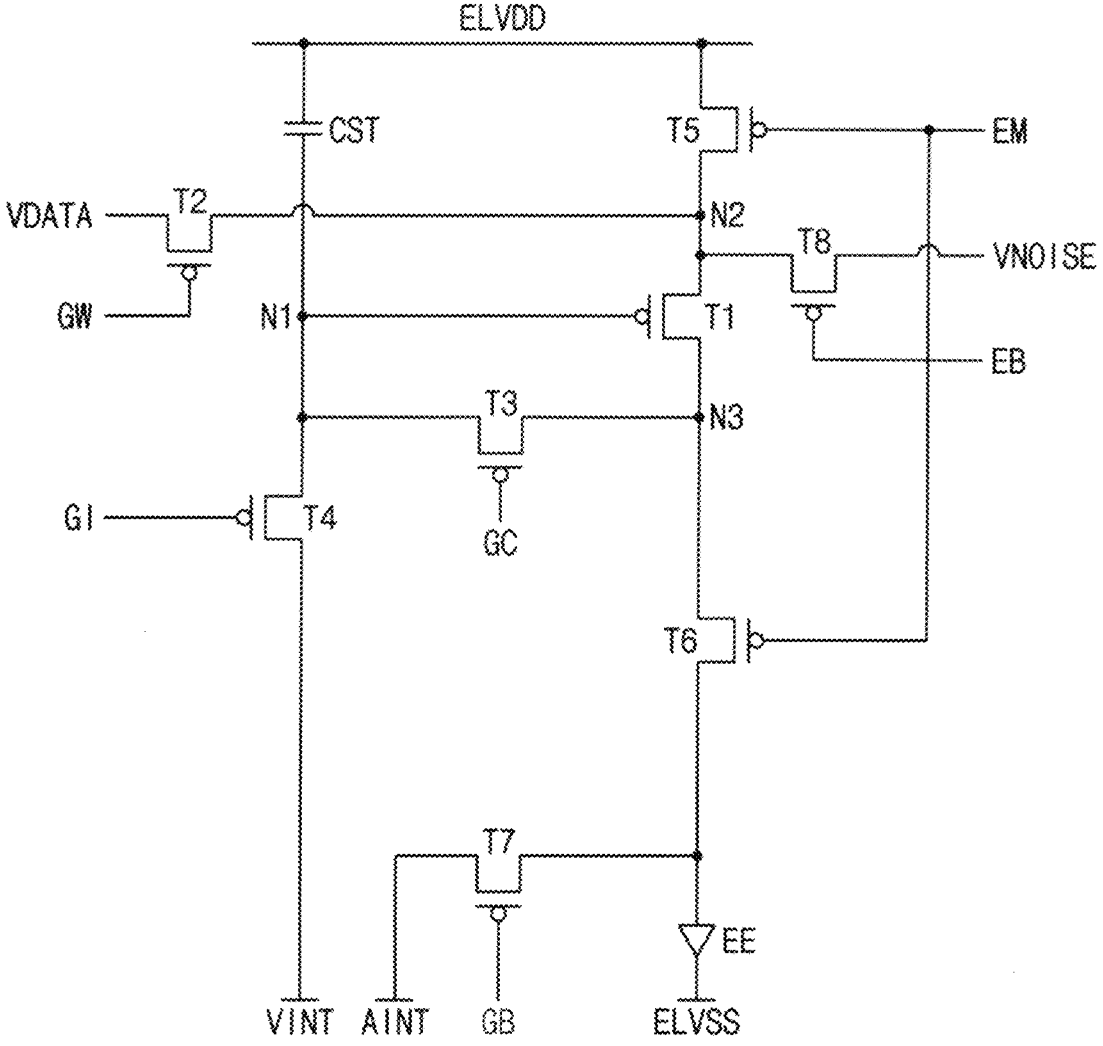
FIG. 18 is a circuit diagram illustrating an embodiment of a pixel of a display panel according to the invention.

FIG. 18 is a circuit diagram illustrating an embodiment of a pixel of a display panel according to the invention.

The display apparatus in the illustrated embodiment is substantially the same as the display apparatus of the previous embodiment explained referring to FIGS. 1 to 14 except for the structure of the pixel. Thus, the same reference numerals will be used to refer to the same or like parts as those described in the previous embodiment of FIGS. 1 to 14 and any repetitive explanation concerning the above elements will be omitted.

Referring to FIG. 18, in the illustrated embodiment, the pixel may be initialized using a first initialization voltage VINT and a second initialization voltage AINT.

More specifically, for example, the pixel may include first to eighth pixel switching elements T1 to T8, a storage capacitor CST and a light-emitting element EE.

The first pixel switching element T1 includes a control electrode connected to a first node N1, an input electrode connected to a second node N2 and an output electrode connected to a third node N3.

The second pixel switching element T2 includes a control electrode receiving the data write gate signal GW, an input electrode receiving the data voltage VDATA and an output electrode connected to the second node N2.

The third pixel switching element T3 includes a control electrode receiving the compensation gate signal GC, an input electrode connected to the first node N1 and an output electrode connected to the third node N3.

Although the third pixel switching element T3 is configured as a single transistor in FIG. 18 for convenience of explanation, the third pixel switching element T3 may include two transistors (dual transistors) connected to each other in series.

The fourth pixel switching element T4 may include a control electrode receiving the data initialization gate signal GI, an input electrode receiving the first initialization voltage VINT and an output electrode connected to the first node N1.

Although the fourth pixel switching element T4 is configured as a single transistor in FIG. 18 for convenience of explanation, the fourth pixel switching element T4 may include two transistors (dual transistors) connected to each other in series.

The fifth pixel switching element T5 includes a control electrode receiving the emission signal EM, an input electrode receiving a first power voltage ELVDD and an output electrode connected to the second node N2.

The sixth pixel switching element T6 includes a control electrode receiving the emission signal EM, an input electrode connected to the third node N3 and an output electrode connected to an anode electrode of the light-emitting element EE.

The seventh pixel switching element T7 includes a control electrode receiving the light-emitting element initialization gate signal GB, an input electrode receiving the second initialization voltage AINT and an output electrode connected to the anode electrode of the light-emitting element EE.

The eighth pixel switching element T8 includes a control electrode receiving the noise control signal EB, an input electrode receiving the noise signal VNOISE and an output electrode connected to the second node N2.

In an embodiment, the first to eighth pixel switching elements T1 to T8 may be P-type TFTs, for example. The control electrodes of the first to eighth pixel switching elements T1 to T8 may be gate electrodes, the input electrodes of the first to eighth pixel switching elements T1 to T8 may be source electrodes and the output electrodes of the first to eighth pixel switching elements T1 to T8 may be drain electrodes. However, the invention is not limited thereto, and in another embodiment, the input electrodes of the first to eighth pixel switching elements T1 to T8 may be drain electrodes and the output electrodes of the first to eighth pixel switching elements T1 to T8 may be source electrodes.

The storage capacitor CST includes a first electrode receiving the first power voltage ELVDD and a second electrode connected to the first node N1.

The light-emitting element EE includes the anode electrode and a cathode electrode receiving a second power voltage ELVSS. An amplitude of the second power voltage ELVSS may be less than that of the first power voltage ELVDD.

Herein, the first pixel switching element T1 may be also referred to as the driving switching element and the eighth pixel switching element T8 may be also referred to as the noise switching element.

In the illustrated embodiment, when an image displayed on the display panel 100 is a static image or the display panel 100 is operated in always-on mode, the driving frequency FR of the display panel 100 may be decreased to reduce a power consumption of the display apparatus.

The noise signal having a periodicity may be applied to the input electrode of the driving switching element T1 of the pixel so that the flicker due to the current leakage may be reduced when the display panel 100 is driven at the low driving frequency. The flicker may be reduced so that the display quality of the display panel 100 may be enhanced.

According to the display apparatus of the invention as explained above, the power consumption of the display apparatus may be reduced and the display quality of the display panel may be enhanced.

The foregoing is illustrative of the invention and is not to be construed as limiting thereof. Although a few embodiments of the invention have been described, those skilled in the art will readily appreciate that many modifications are possible in the embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A pixel comprising:

a light-emitting element;

a driving switching element which applies a driving current to the light-emitting element; and a noise switching element which outputs a noise signal to an input electrode of the driving switching element in response to a noise control signal having a noise frequency and applied to a control terminal of the noise switching element, wherein the noise frequency is equal to or only greater than a driving frequency of the pixel, and wherein as the driving frequency decreases, the noise frequency decreases.

2. The pixel of claim 1, wherein further comprising:

a first pixel switching element including a control electrode connected to a first node, an input electrode connected to a second node and an output electrode connected to a third node;

a second pixel switching element including a control electrode which receives a data write gate signal, an input electrode which receives a data voltage and an output electrode connected to the second node;

a third pixel switching element including a control electrode which receives a compensation gate signal, an input electrode connected to the first node and an output electrode connected to the third node;

a fourth pixel switching element including a control electrode which receives a data initialization gate signal, an input electrode which receives an initialization voltage and an output electrode connected to the first node;

a fifth pixel switching element including a control electrode which receives an emission signal, an input electrode which receives a first power voltage and an output electrode connected to the second node;

a sixth pixel switching element including a control electrode which receives the emission signal, an input electrode connected to the third node and an output electrode connected to an anode electrode of the light-emitting element;

a seventh pixel switching element including a control electrode which receives a light-emitting element initialization gate signal, an input electrode which receives the initialization voltage and an output electrode connected to the anode electrode of the light-emitting element;

an eighth pixel switching element including a control electrode which receives the noise control signal, an input electrode which receives a noise voltage which represents an intensity of the noise signal and an output electrode connected to the second node; and the light-emitting element including the anode electrode and a cathode electrode which receives a second power voltage, wherein the driving switching element is the first pixel switching element, and wherein the noise switching element is the eighth pixel switching element.

3. The pixel of claim 1, further comprising:

a first pixel switching element including a control electrode connected to a first node, an input electrode connected to a second node and an output electrode connected to a third node;

a second pixel switching element including a control electrode which receives a data write gate signal, an input electrode which receives a data voltage and an output electrode connected to the second node;

a third pixel switching element including a control electrode which receives a compensation gate signal, an input electrode connected to the first node and an output electrode connected to the third node;

a fourth pixel switching element including a control electrode which receives a data initialization gate signal, an input electrode which receives a first initialization voltage and an output electrode connected to the first node;

a fifth pixel switching element including a control electrode which receives an emission signal, an input electrode which receives a first power voltage and an output electrode connected to the second node;

a sixth pixel switching element including a control electrode which receives the emission signal, an input electrode connected to the third node and an output electrode connected to an anode electrode of the light-emitting element;

a seventh pixel switching element including a control electrode which receives a light-emitting element initialization gate signal, an input electrode which receives a second initialization voltage and an output electrode connected to the anode electrode of the light-emitting element;

an eighth pixel switching element including a control electrode which receives the noise control signal, an input electrode which receives a noise voltage which represents an intensity of the noise signal and an output electrode connected to the second node; and the light-emitting element including the anode electrode and a cathode electrode which receives a second power voltage, wherein the driving switching element is the first pixel switching element, and wherein the noise switching element is the eighth pixel switching element.

4. A display apparatus comprising:

a display panel including a pixel comprising:

a light-emitting element;

a driving switching element which applies a driving current to the light-emitting element; and a noise switching element outputs a noise signal to an input electrode of the driving switching element in response to a noise control signal having a noise frequency and applied to a control terminal of the noise switching element;

a gate driver which applies a gate signal to the pixel;

a data driver which applies a data voltage to the pixel;

an emission driver which applies an emission signal to the pixel; and a noise generator which generates the noise signal based on a driving frequency of the display panel, wherein the noise signal is applied to an input electrode of the driving switching element, and wherein the noise frequency is equal to or only greater than the driving frequency, and wherein as the driving frequency decreases, the noise frequency decreases.

5. The display apparatus of claim 4, wherein the noise generator comprises a noise frequency determiner which determines the noise frequency based on the driving frequency.

6. The display apparatus of claim 4, wherein the noise generator comprises a noise voltage determiner which determines a noise voltage which represents an intensity of the noise signal based on the driving frequency and an end-to-start luminance ratio of the display panel.

7. The display apparatus of claim 6, wherein as the driving frequency decreases, the noise voltage increases.

8. The display apparatus of claim 6, wherein as the end-to-start luminance ratio of the display panel decreases, the noise voltage increases.

9. The display apparatus of claim 4, wherein the noise generator comprises a noise voltage determiner which determines a noise voltage which represents an intensity of the noise signal based on the driving frequency, an end-to-start luminance ratio of the display panel and grayscale data of input image data.

10. The display apparatus of claim 4, wherein the pixel further comprises:

a first pixel switching element including a control electrode connected to a first node, an input electrode connected to a second node and an output electrode connected to a third node;

a second pixel switching element including a control electrode which receives a data write gate signal, an input electrode which receives the data voltage and an output electrode connected to the second node;

a third pixel switching element including a control electrode which receives a compensation gate signal, an input electrode connected to the first node and an output electrode connected to the third node;

a fourth pixel switching element including a control electrode which receives a data initialization gate signal, an input electrode which receives an initialization voltage and an output electrode connected to the first node;

a fifth pixel switching element including a control electrode which receives the emission signal, an input electrode which receives a first power voltage and an output electrode connected to the second node;

a sixth pixel switching element including a control electrode which receives the emission signal, an input electrode connected to the third node and an output electrode connected to an anode electrode of the light-emitting element;

a seventh pixel switching element including a control electrode which receives a light-emitting element initialization gate signal, an input electrode which receives the initialization voltage and an output electrode connected to the anode electrode of the light-emitting element;

an eighth pixel switching element including a control electrode which receives the noise control signal, an input electrode which receives a noise voltage which represents an intensity of the noise signal and an output electrode connected to the second node; and the light-emitting element including the anode electrode and a cathode electrode which receives a second power voltage, wherein the driving switching element is the first pixel switching element, and wherein the noise switching element is the eighth pixel switching element.

11. The display apparatus of claim 4, wherein the pixel further comprises:

a first pixel switching element including a control electrode connected to a first node, an input electrode connected to a second node and an output electrode connected to a third node;

a second pixel switching element including a control electrode which receives a data write gate signal, an input electrode which receives the data voltage and an output electrode connected to the second node;

a third pixel switching element including a control electrode which receives a compensation gate signal, an input electrode connected to the first node and an output electrode connected to the third node;

a fourth pixel switching element including a control electrode which receives a data initialization gate signal, an input electrode which receives a first initialization voltage and an output electrode connected to the first node;

a fifth pixel switching element including a control electrode which receives the emission signal, an input electrode which receives a first power voltage and an output electrode connected to the second node;

a sixth pixel switching element including a control electrode which receives the emission signal, an input electrode connected to the third node and an output electrode connected to an anode electrode of the light-emitting element;

a seventh pixel switching element including a control electrode which receives a light-emitting element initialization gate signal, an input electrode which receives a second initialization voltage and an output electrode connected to the anode electrode of the light-emitting element;

an eighth pixel switching element including a control electrode which receives the noise control signal, an input electrode which receives a noise voltage which represents an intensity of the noise signal and an output electrode connected to the second node; and the light-emitting element including the anode electrode and a cathode electrode which receives a second power voltage, wherein the driving switching element is the first pixel switching element, and wherein the noise switching element is the eighth pixel switching element.

12. The display apparatus of claim 4, wherein the pixel further comprises a data writing switching element which outputs a noise data voltage which is a sum of the data voltage and the noise signal to the input electrode of the driving switching element in response to the data write gate signal.

13. The display apparatus of claim 4, wherein the noise generator determines the noise frequency and outputs the noise frequency to the gate driver, and wherein the noise generator determines a noise voltage which represents an intensity of the noise signal and outputs the noise voltage to the display panel.

14. The display apparatus of claim 4, wherein the noise generator determines the noise frequency and a noise voltage which represents an intensity of the noise signal and outputs the noise frequency and the noise voltage to the data driver.

15. A method of driving a display apparatus, the method comprising:

applying a gate signal to a pixel including a light-emitting element and a driving switching element which applies a driving current to the light-emitting element;

applying a data voltage to the pixel;

applying a noise signal outputted by a noise switching element to an input electrode of the driving switching element in response to a noise control signal having a noise frequency and applied to a control terminal of the noise switching element; and applying an emission signal to the pixel, wherein the noise frequency is equal to or only greater than a driving frequency, and wherein as the driving frequency decreases, the noise frequency decreases.

* * * * *